(12) United States Patent
Ogura et al.

(10) Patent No.: US 7,738,927 B2
(45) Date of Patent: Jun. 15, 2010

(54) IN-VEHICLE HAND-FREE APPARATUS

(75) Inventors: Eiji Ogura, Niiza (JP); Mitsuru Yamamoto, Niiza (JP); Yuko Yamada, Niiza (JP)

(73) Assignee: Honda Access Corporation, Niiza-shi (JP)

( * ) Notice: Subject to any disclaimer, the term of this patent is extended or adjusted under 35 U.S.C. 154(b) by 362 days.

(21) Appl. No.: 11/319,647

(22) Filed: Dec. 29, 2005

(65) Prior Publication Data

US 2006/0154698 A1    Jul. 13, 2006

(30) Foreign Application Priority Data

Jan. 7, 2005    (JP)    ............... 2005-003212

(51) Int. Cl.
    *H04M 1/00*    (2006.01)
(52) U.S. Cl. ............... 455/569.2; 455/550.1; 455/575.9
(58) Field of Classification Search .............. 455/569.1, 455/575.9
    See application file for complete search history.

(56) References Cited

U.S. PATENT DOCUMENTS 7,266,204 B2 *   9/2007   Watson et al. .................. 381/86

2004/0063471 A1 *   4/2004   Kindo et al. ................. 455/566

FOREIGN PATENT DOCUMENTS

| JP | 10-248089 | 9/1998 |
|---|---|---|
| JP | 2001-197166 A | 7/2001 |
| JP | 2001-251416 A | 9/2001 |
| JP | 2002-111831 | 4/2002 |
| JP | 2004-312538 | 11/2004 |
| JP | 2005-006090 A | 1/2005 |

OTHER PUBLICATIONS

British Search Report under Section 17(5) of corresponding GB0600246.3 mailed on May 5, 2006.
Office Action issued in GB Appln. No. 0600246.3 by UK Patent Office on Nov. 26, 2008.
Nokia, Advanced Car Kit CK-7W User Guide.
Motorola, Manual for QG-H3.

* cited by examiner

*Primary Examiner*—Patrick N Edouard
*Assistant Examiner*—Michael T Thier
(74) *Attorney, Agent, or Firm*—Westerman, Hattori, Daniels & Adrian, LLP

(57) ABSTRACT

An in-vehicle hand-free apparatus that is for ensuring hand-free talk by a short-range wireless communication system in compliance with the Bluetooth includes a notification unit which notifies the status of the in-vehicle hand-free apparatus. As the in-vehicle hand-free apparatus notifies the status thereof by the notification unit, the user can easily perceive the status of the in-vehicle hand-free apparatus.

10 Claims, 9 Drawing Sheets

FIG.7

(a) Timing of Pressing Answer Switch
(b) Timing of Sound Generation by Speaker
(c) Timing of Wireless Communication by Bluetooth Communication Processor
(d) Timing of Receiving Incoming Call
(e) Timing of Light Emission by Blue LED

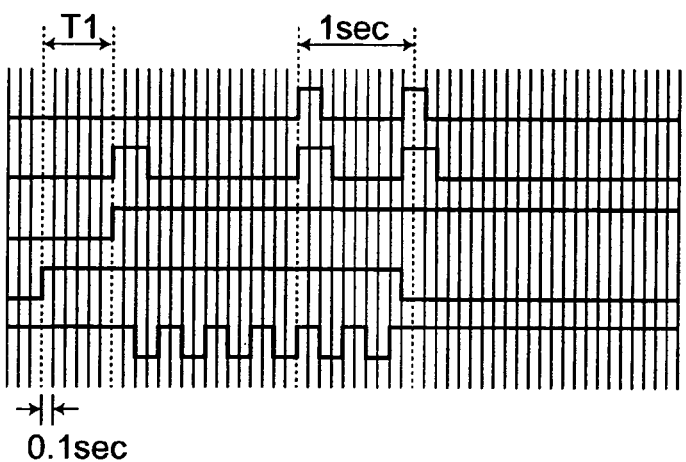

FIG.8

(a) Timing of Pressing Volume-down Switch
(b) Timing of Sound Generation by Speaker When Shifting Manual Mode to Auto Mode
(c) Timing of Sound Generation by Speaker When Shifting Auto Mode to Manual Mode

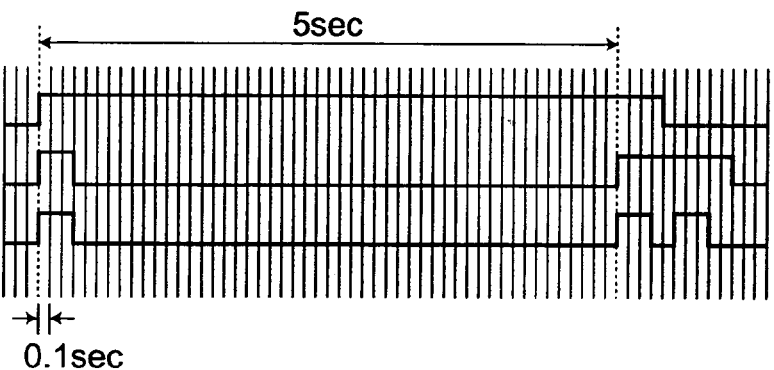

FIG.9

(a) Timing of Pressing Volume-up Switch
(b) Timing of Pressing Answer Switch
(c) Timing of Sound Generation by Speaker
(d) Timing of Wireless Communication by Bluetooth Communication Processor
(e) Timing of Transmission Process
(f) Timing of Light Emission by Blue LED

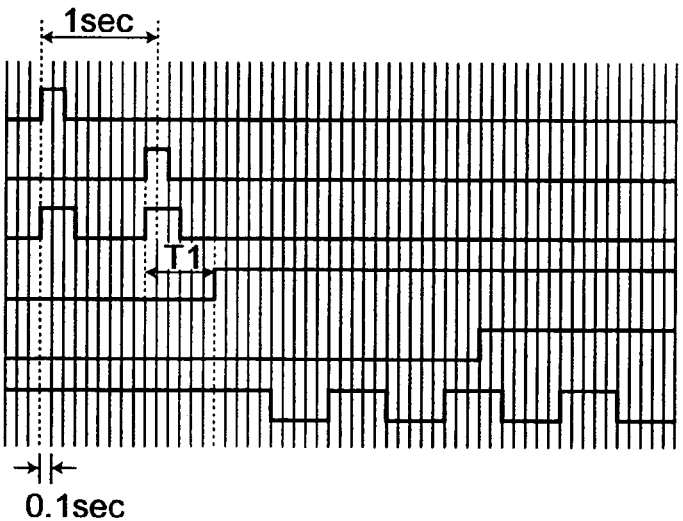

IN-VEHICLE HAND-FREE APPARATUS

BACKGROUND OF THE INVENTION

1. Field of the Invention

The present invention relates to an in-vehicle hand-free apparatus, and is suitable for application to an in-vehicle hand-free apparatus which includes a hand-free remote controller which is wirelessly connected to, for example, a cellular phone, and enables voice talking.

2. Description of the Related Art

Japanese Unexamined Patent Publication No. 2002-111831 discloses an in-vehicle hand-free apparatus which enables a user to talk on a cellular phone without holding the cellular phone while driving, for example, a car.

In practice, the in-vehicle hand-free apparatus comprises a control unit which controls the whole in-vehicle hand-free apparatus, and a hand-free remote controller which has wired connection to the control unit, and ensures wireless connection to a cellular phone by wireless communication conforming to the Bluetooth (registered trademark) as wireless communication standard. This apparatus enables a user to talk on a cellular phone or a wired telephone through the hand-free remote controller.

The in-vehicle hand-free apparatus with such a structure permits the hand-free remote controller to be located on a pillar which is positioned near the front of the head of the user sitting at a driver's seat, making it possible to prevent the interruption of wireless communication between the cellular phone and the hand-free remote controller due to an obstacle or the like, and ensure talking without holding the cellular phone.

The in-vehicle hand-free apparatus employing the above-described structure, however, does not confirm the status of the hand-free remote controller as to, for example, whether or not the cellular phone currently performs talking through the hand-free remote controller.

With the in-vehicle hand-free apparatus employing the above-described structure, in particular, no voice talking is carried out in a state where the cellular phone directly connected to the hand-free remote controller in a wireless manner does not establish a call with a base station, i.e., the cellular phone is in a standby mode. It is difficult to make the user recognize whether or not the cellular phone and the hand-free remote controller are properly wirelessly connected to each other (that is, establish synchronization).

The invention has been made in view of such circumstances, and it is an object of the invention to provide an in-vehicle hand-free apparatus which enables a user to easily confirm the status of the in-vehicle hand-free apparatus.

SUMMARY OF THE INVENTION

To achieve the object, according to an aspect of the invention, an in-vehicle hand-free apparatus which is for ensuring hand-free talking in a vehicle using a phone comprises a notification unit which notifies a status of the in-vehicle hand-free apparatus.

The in-vehicle hand-free apparatus may further comprise an operating unit, and the notification unit may be a light emitting unit which operates in accordance with an operation of the operating unit performed by a user.

The in-vehicle hand-free apparatus may further comprise an operating unit, and the notification unit may be a sound generating device which operates in accordance with an operation of the operating unit performed by a user.

The in-vehicle hand-free apparatus may further comprise an operating unit, and the notification unit may comprise a light emitting unit and a sound generating device both of which operate in accordance with an operation of the operating unit performed by a user.

The light emitting unit may be provided at the back of the operating unit.

The light emitting unit may change an emission state to notify the status of the in-vehicle hand-free apparatus.

The sound generating device may change a sound state to notify the status of the in-vehicle hand-free apparatus.

The light emitting unit may change an emission state to notify the status of the in-vehicle hand-free apparatus, and the sound generating device may change a sound state to notify the status of the in-vehicle hand-free apparatus.

The light emitting unit may change an emission state to notify the status of the in-vehicle hand-free apparatus.

The in-vehicle hand-free apparatus may be wirelessly connected to the phone by radio waves of a short-range wireless communication system, and upon recognition of that wireless connection, the notification unit notifies the user of a result of that recognition.

The notification unit may include at least one of a light emitting unit and a sound generating device, and when the in-vehicle hand-free apparatus is unable to establish synchronization with the phone and is not wirelessly connected thereto, the sound generating device may generate a predetermined disconnection-state indicating sound, or the light emitting unit may turn out light.

When the in-vehicle hand-free apparatus has established synchronization with the phone to be wirelessly connected thereto, the light emitting unit may emit light.

The notification unit may be a light emitting unit which flickers in a first period to notify the user of talking over the phone being in progress when talking over the phone starts, and flickers in a second period to notify the user of an incoming call to the phone when the phone has received that call.

The in-vehicle hand-free may further comprise a case body on whose front side the operating unit is provided, the light emitting unit provided in a transparent cover in front of the case body, and the user may see the emission state of the light emitting unit through the transparent cover.

The case body may be located on a pillar positioned near the front of the head of the user sitting at a driver's seat.

BRIEF DESCRIPTION OF THE DRAWINGS

The object, other objects, and advantages of the invention will be more apparent upon reading the following detailed description together with the accompanying drawings in which:

FIGS. 7(a) to 7(e) are timing charts illustrating a timing for rejecting reception of an incoming call;

FIGS. 8(a) to 8(c) are timing charts illustrating timings for transition between a manual mode and an auto mode;

FIGS. 9(a) to 9(f) are timing charts illustrating a timing for a redial operation;

DETAILED DESCRIPTION OF THE PREFERRED EMBODIMENTS

Embodiments of the invention will be described in detail with reference to the accompanying drawings.

(General Structure of Hand-Free System)

Figure 1:
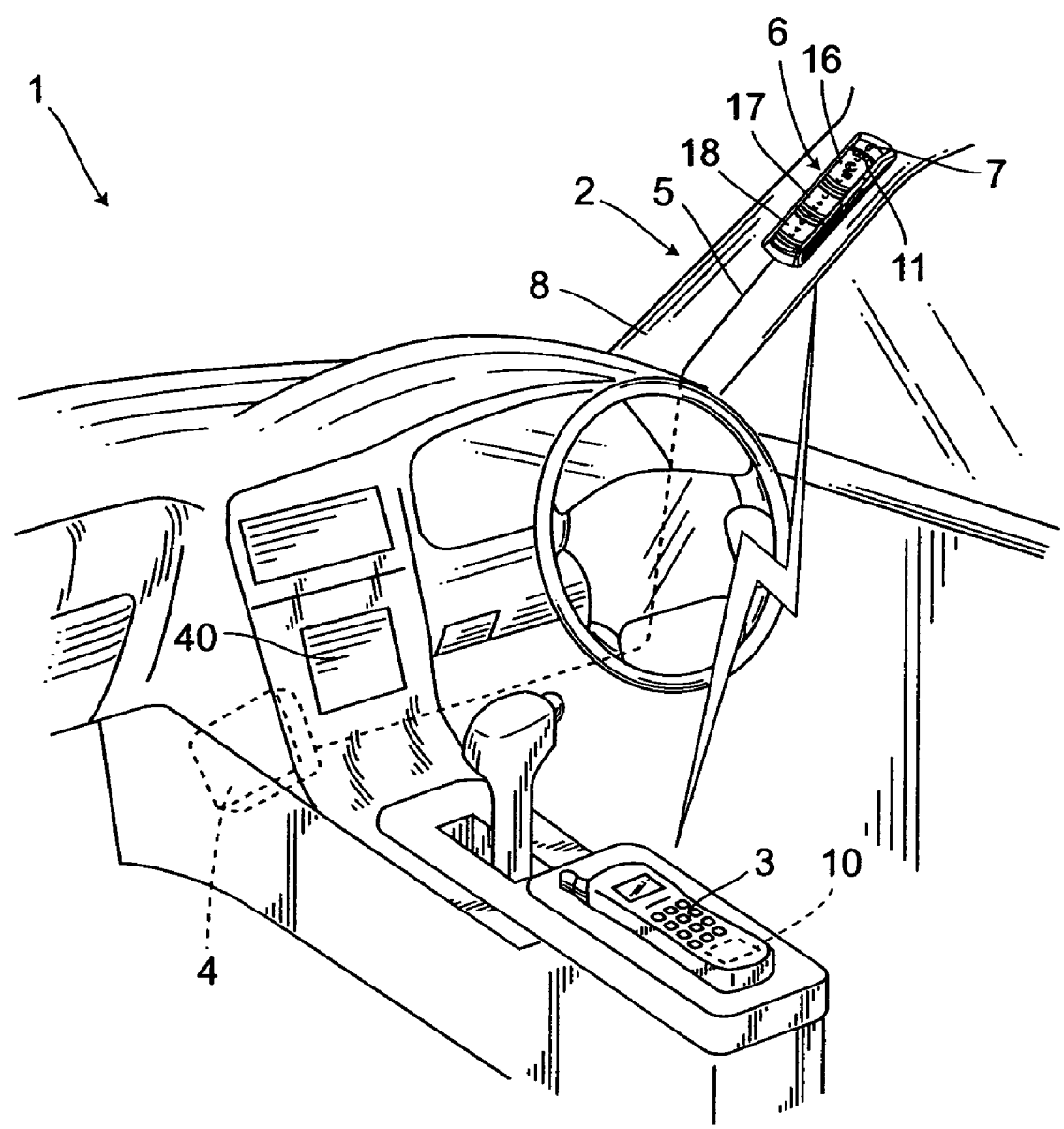
FIG. 1 is a perspective view illustrating the general structure of a hand-free system.
Figure 2:
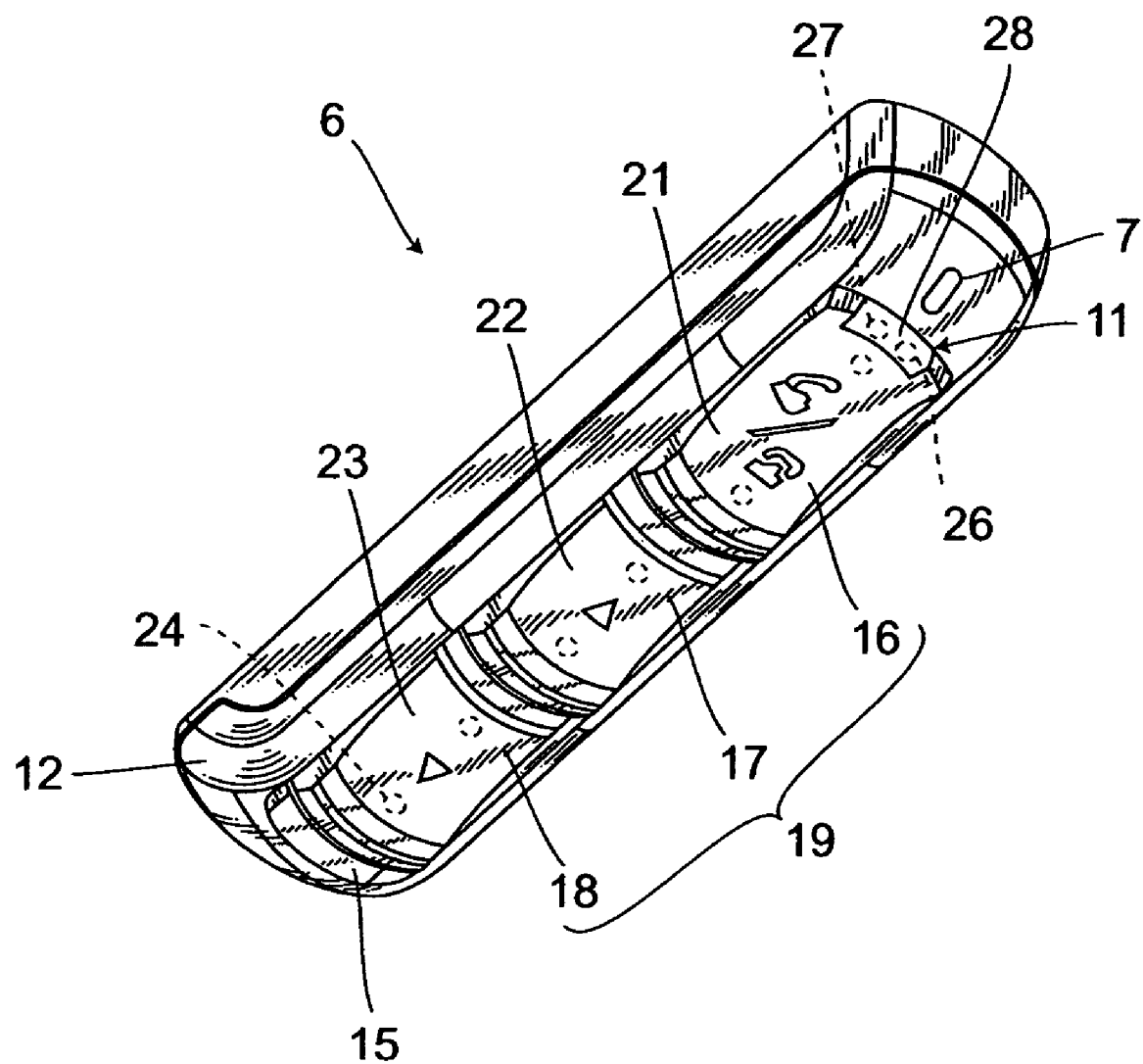
FIG. 2 is a perspective view illustrating the contour and structure of a hand-free remote controller according to the invention.
Figure 3:
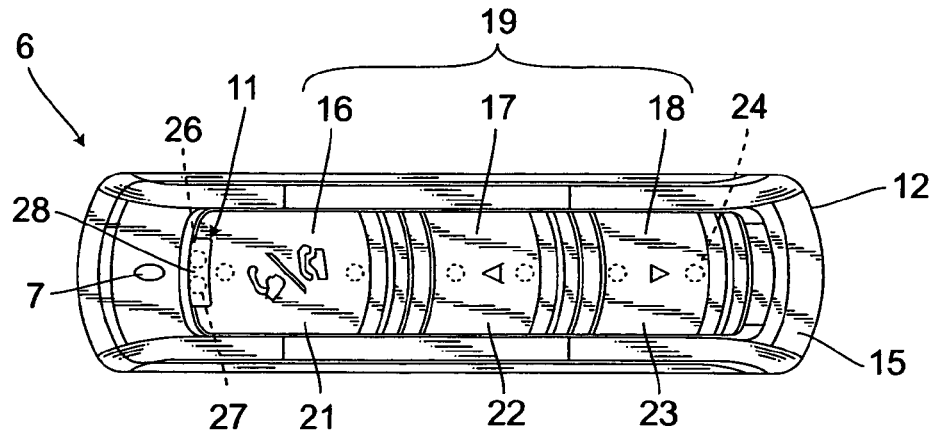
FIGS. 3(a) to 3(c) are schematic diagrams respectively illustrating the front structure of the hand-free remote controller, the cross-sectional structure thereof, and the rear structure thereof.
Figure 3:
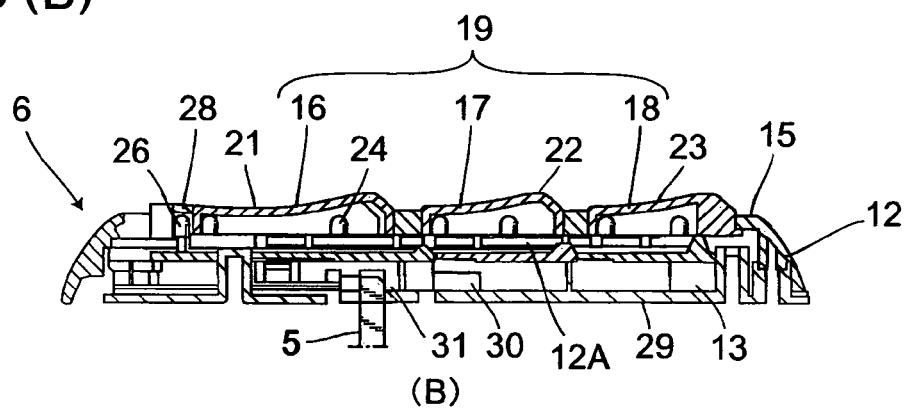
Figure 3:
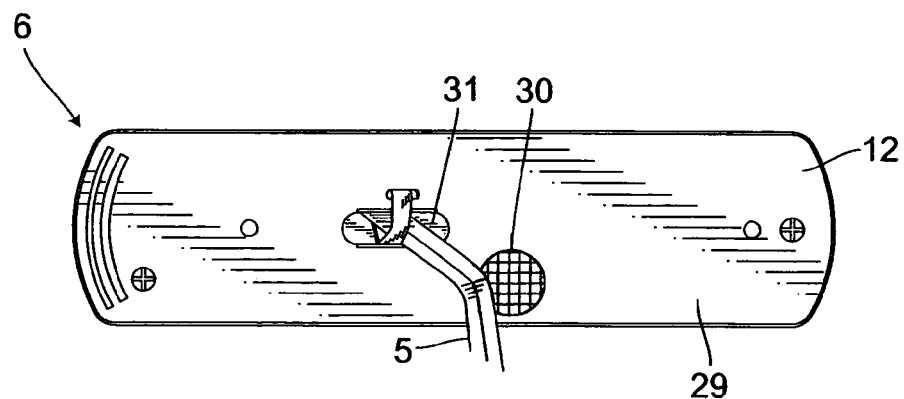

A hand-free system 1 in FIG. 1 comprises an in-vehicle hand-free apparatus 2 which is disposed in a vehicle to ensure hand-free talking, and a cellular phone 3 which can wirelessly communicate with the in-vehicle hand-free apparatus 2. The in-vehicle hand-free apparatus 2 comprises a control unit 4 which is disposed in an arbitrary location, such as in a center console, or in a front panel, and a hand-free remote controller 6 connected to the control unit 4 by a cable 5.

The in-vehicle hand-free apparatus 2 establishes synchronization of the hand-free remote controller 6 with the cellular phone 3 and wireless connection therebetween by wireless communication conforming to the Bluetooth (registered trademark) as wireless communication standard. Accordingly, after wireless connection between the hand-free remote controller 6 and the cellular phone 3 is established, wireless communication is started between the hand-free remote controller 6 and the cellular phone 3 establishing a call with a base station (not illustrated).

The hand-free remote controller 6 is located on a pillar positioned near the front of the head of a user at a driver's seat, so that a microphone 7 is located relatively close to the mouth of the user sitting at the driver's seat. This enables a user to talk to another cellular phone (not illustrated) or a wired telephone (not illustrated) without holding the cellular phone 3.

The cellular phone 3 used by the hand-free system 1 includes, for example, a Bluetooth module 10 in the casing of the cellular phone so as to ensure wireless connection to the hand-free remote controller 6 by wireless communication method confirm to the Bluetooth as wireless communication standard.

The Bluetooth is a short-range wireless data communication standard which is standardized by the Bluetooth SIG (Special Interest Group) as a standardization group. The Bluetooth sets 79 channels of 1-MHz bandwidths in the 2.4-GHz ISM band, uses a frequency hopping type spread spectrum communication system which switches the channel 1600 times per second, and ensures wireless data communication over a distance of approximately 10 m at a data transfer rate of 1 Mbits/sec (effective rate: 721 kbits/sec).

In addition, the hand-free remote controller 6 is provided with an light emitting unit 11 and a speaker (to be discussed later), both as notification means, allows the light emitting unit 11 to emit light in a predetermined way according to a state where synchronization with the cellular phone 3 is established and the state of wireless communication, and generates a predetermined notifying sound from the speaker, thereby visually and aurally notifying the user of either the wireless-connection state (synchronization established state) or the wireless communication state.

In practice, as illustrated in FIG. 2, and FIGS. 3(a) to 3(c), the hand-free remote controller 6 has a case body 12 generally formed in an approximately rectangular shape. The case body 12 houses a circuit board 12A on which various circuits of the hand-free remote controller 6 are disposed.

In the case body 12, a Bluetooth antenna 13 and a Bluetooth communication processor (to be discussed later) are disposed in the case body 12 on one end side, and the microphone 7 is disposed in the front of the other end side.

Provided on a top face 15 of the case body 12 along the lengthwise direction is an operating unit 19 which comprises an answer switch 16 for talking in response to an incoming call, terminating talk, and turning off power, a volume-up switch 17 for turning up the volume of the voice of a talking party output from an in-vehicle front speaker (not illustrated), and a volume-down switch 18 for turning down the volume of the voice of the talking party, and switching between manual and auto modes (to be discussed later). The operating unit 19 is provided with semi-transparent covers 21, 22, and 23 respectively having optimal patterns according to the functions of the answer switch 16, the volume-up switch 17, and the volume-down switch 18.

A plurality of backlight LEDs (Light Emitting Diodes) 24 are provided at locations which are covered with the semi-transparent covers 21, 22, and 23. Accordingly, the backlight LEDs 24 (for example, green LEDs) of the hand-free remote 6 emit lights from the inside the semi-transparent covers 21, 22, and 23 to highlight the patterns, so that the user can easily identify the answer switch 16, volume-up switch 17, and volume-down switch 18 in the night.

In addition, the light emitting unit 11 is provided on the top face 15 of the case body 12 and covered with a transparent cover 28. The light emitting unit 11 comprises a blue LED 26 and a red LED 27 disposed on the rear face of one end side of the operating unit 19 in such a way that those LEDs are arranged in the widthwise direction of the case body 12. Light emissions of the blue LED 26 and the red LED 27 from inside the transparent cover 28 enable the user to see the emission states of those LEDs 26 and 27 through the transparent cover 28 in the night or in the daytime.

A speaker 30 as a sound generating device is provided near the approximate center of a rear face 29 of the case body 12 which contacts a pillar 8, and the user can be notified of the sound state of the speaker 30. An opening 31 is formed in the approximate center of the rear face 29 of the case body 12, and the cable 5 is pulled out from the opening 31.

(Circuit Structure of In-Vehicle Hand-Free Apparatus)

Figure 4:
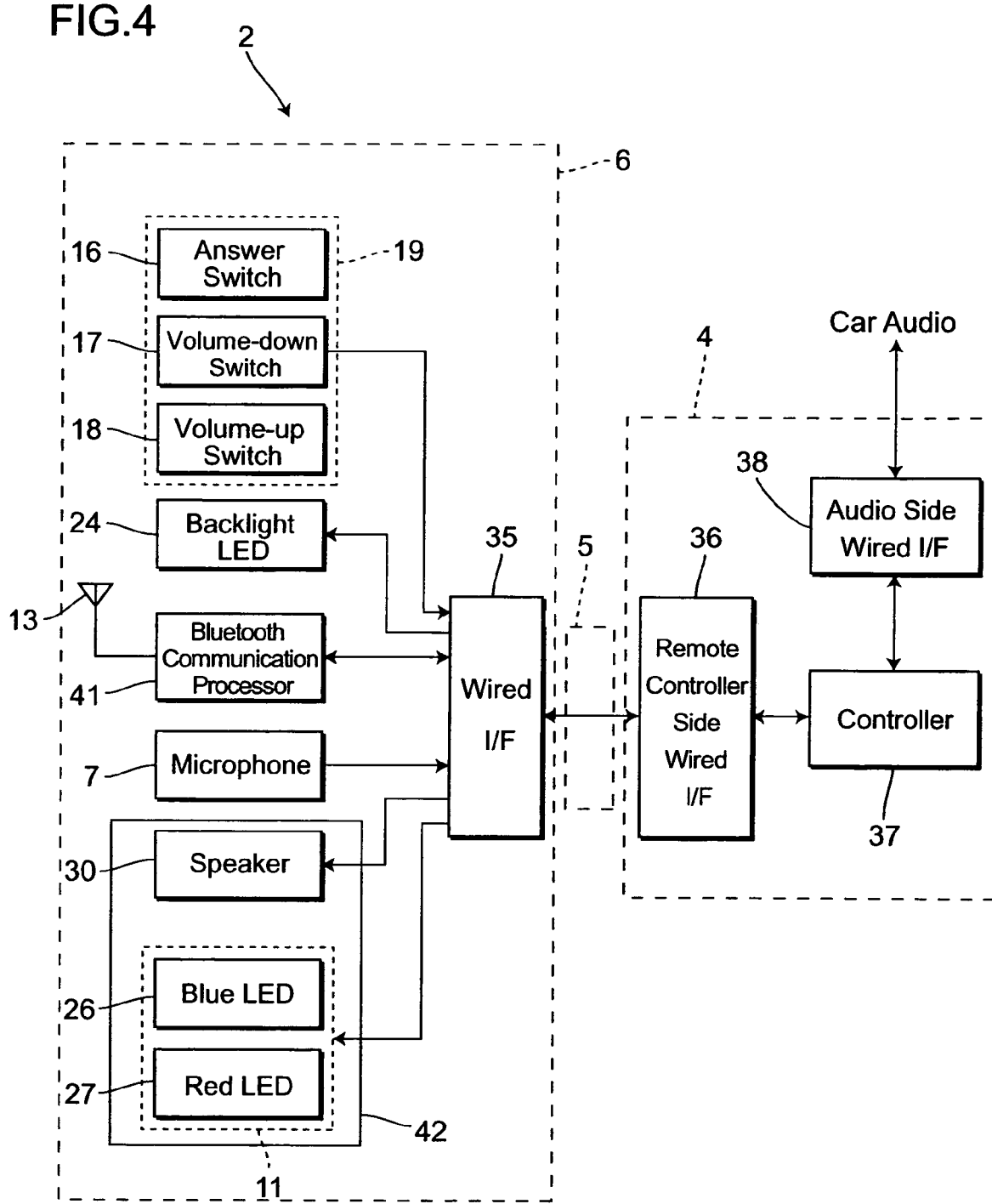
FIG. 4 is a block diagram illustrating the circuit structure of an in-vehicle hand-free apparatus according to the invention.
Figure 5:
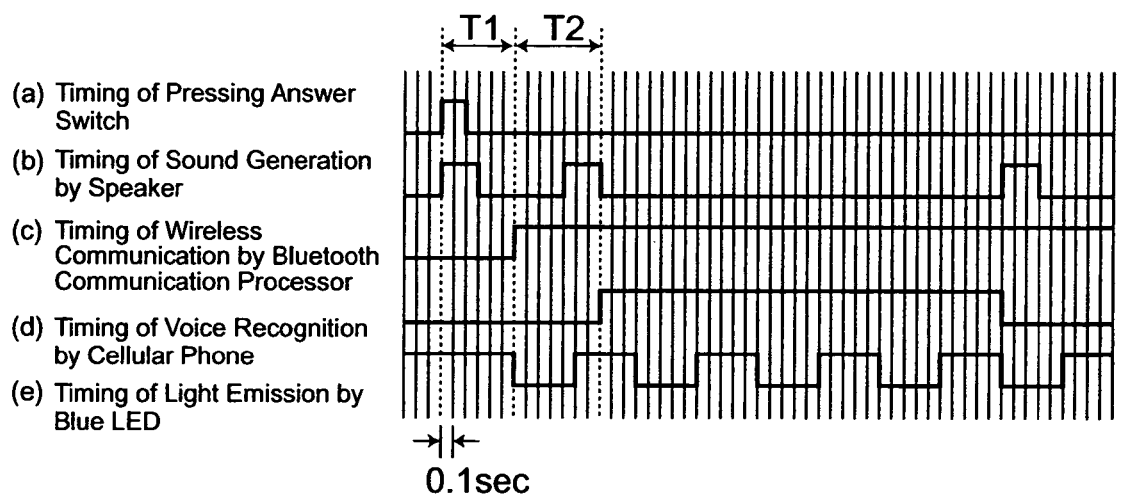
FIGS. 5(a) to 5(e) are timing charts illustrating a timing for a calling instruction operation.
Figure 6:
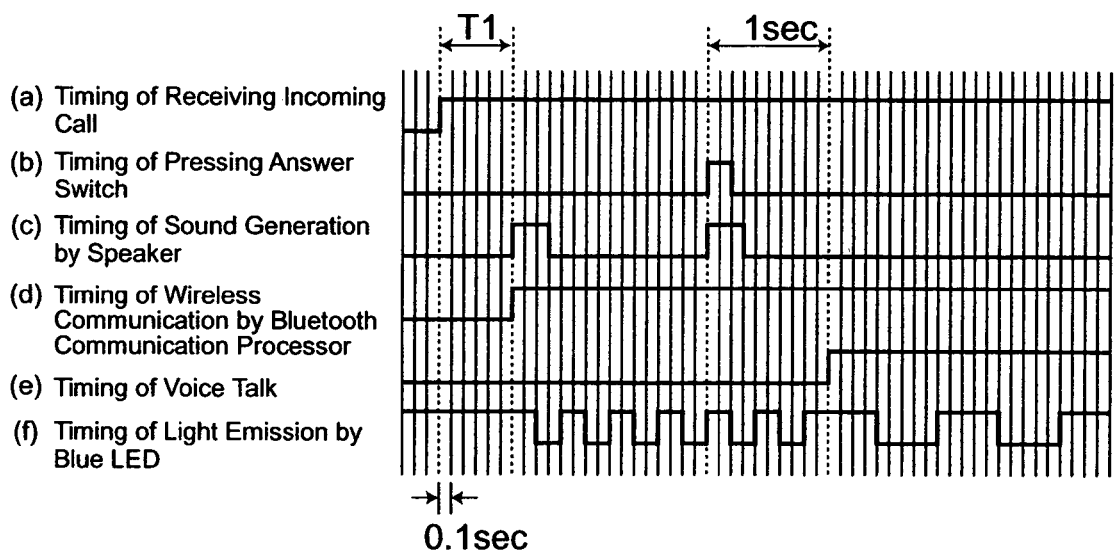
FIGS. 6(a) to 6(f) are timing charts illustrating timings for reception of an incoming call and talking.
Figure 10:
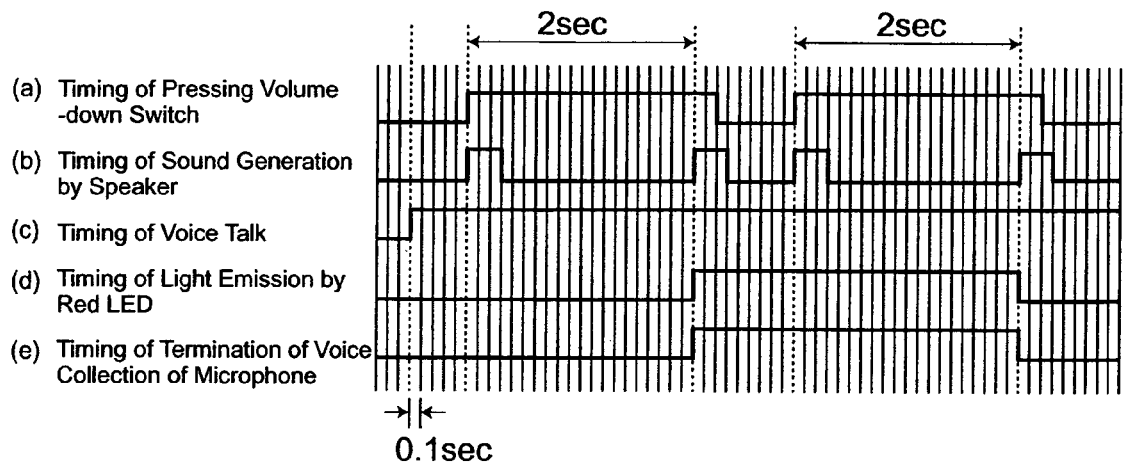
FIGS. 10(a) to 10(e) are timing charts illustrating a timing for a microphone-mute operation.
Figure 11:
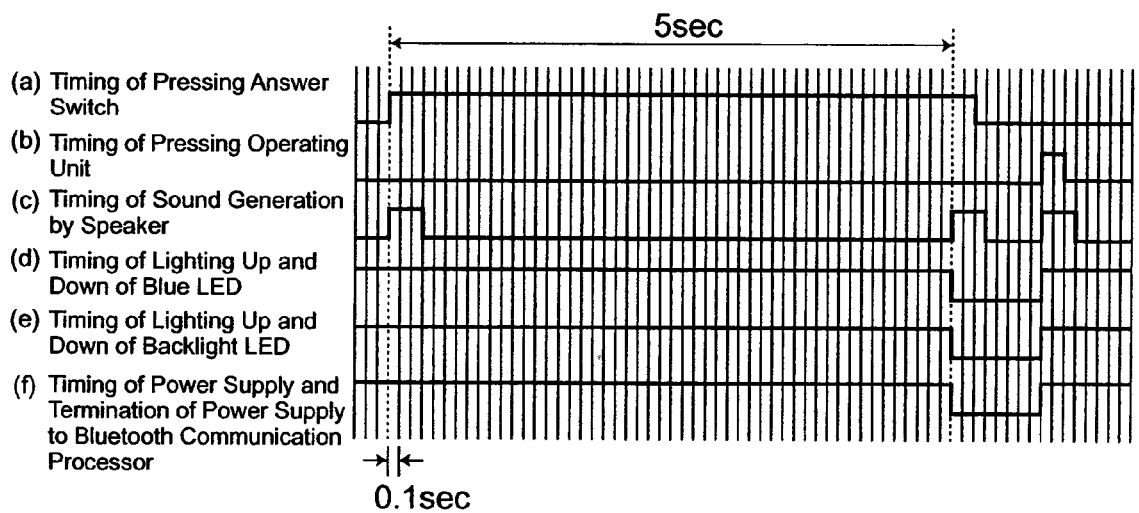
FIGS. 11(a) to 11(f) are timing charts illustrating timings for an ON/OFF operation.

As illustrated in FIG. 4, in the in-vehicle hand-free apparatus 2, a wired interface 35 of the hand-free remote controller 6 and a remote-controller-side wired interface 36 of the control unit 4 are connected together, and various kinds of information are exchanged between the control unit 4 and the hand-free remote controller 6.

In the control unit 4, the remote-controller-side wired interface 36 and an audio-side wired interface 38 are connected to a controller 37 which controls various functions overall, and the audio-side wired interface 38 is connected to a car audio 40 (FIG. 1) and the in-vehicle front speaker (not illustrated).

The hand-free remote controller 6 comprises the operating unit 19 as an operating unit, the backlight LED 24 for illuminating the operating unit 19, a Bluetooth communication processor 41 connected to the Bluetooth antenna 13, the microphone 7 for collecting the voice of the user, and a notification unit 42 as a notification unit. The notification unit 42 comprises the speaker 30 and the light emitting unit 11 including the blue LED 26, and the red LED 27.

In practice, the Bluetooth communication processor 41 allows the hand-free remote controller 6 to establish synchronization (wireless connection) state over the frequency axis and the time axis by sharing frequency hopping patterns and time slots with the Bluetooth module 10 of the cellular phone 3.

In this case, the hand-free remote controller 6 controls one or more cellular phones (not illustrated), thereby causing the cellular phones to synchronize with the frequency hopping patterns and time slots of the remote controller 6. Therefore, the hand-free remote controller 6 can individually maintain synchronization with one or more cellular phones to exchange various kinds of data with the cellular phones.

As explained above, the in-vehicle hand-free apparatus 2 easily ensures wireless communications among a plurality of cellular phones without providing a repeater which corresponds to a base station or the like in addition to voice talking merely by substitution of the cable 5 between the cellular phone 3 and the in-car hand-free apparatus 2.

The in-vehicle hand-free apparatus 2 can register, for example, three specific cellular phones, identified based on the identification information of those cellular phones, beforehand. When powered on, the in-vehicle hand-free apparatus 2 preferentially establishes synchronization with the registered three cellular phones based on the identification information, and stores a talking log of the registered three cellular phones.

In practice, the controller 37 sends a query signal through the antenna 13, and receives a response signal from an answered cellular phone, determines whether or not the answered cellular phone is one of the three cellular phones registered beforehand based on the identification information, and preferentially establishes synchronization with the registered three cellular phones. When the in-vehicle hand-free apparatus 2 is powered on, for example, the controller 37 specifies the cellular phone among the registered cellular phones that has carried out voice talking last based on the talking log, and sends a query signal for establishing synchronization with this specified cellular phone for a predetermined period (for example, approximately one minute). Next, the controller 37 sends a query signal for establishing synchronization with that one of the remaining two registered cellular phones which is used for voice talking more than the other one for a predetermined period (for example, approximately one minute). Then, the controller 37 sends a query signal for establishing synchronization with the last remaining registered cellular phone for a predetermined period (for example, approximately one minute). In this manner, the controller 37 sequentially searches for the registered three cellular phones, and establishes synchronizations for wireless connection when receiving a response signals from any one of the registered three cellular phones.

After establishing the synchronizations with those registered three cellular phones, when receiving a response signal from a new cellular phone, the controller 37 specifies a cellular phone which is least frequently used for voice talking based on the talking log, and establishes synchronization with the new cellular phone instead of the specified cellular phone.

In addition to such a structure, the controller 37 generates an connection-state indicating emission signal when having acknowledged the synchronization with the cellular phone 3 based on a signal from the Bluetooth communication processor 41, and sends the connection-state indicating emission signal to the light emitting unit 11 of the notification unit 42 through the remote-controller-side wired interface 36 and the wired interface 35, in order.

Accordingly, the light emitting unit 11 as the light emitting unit turns on the OFF-state blue LED 26 based on the connection-state indicating emission signal. Thus, the light emitting unit 11 can allow the user to intuitively notice that the synchronization for the wireless connection have been established between the hand-free remote controller 6 and the cellular phone 3 through the user's visual sense by turning the blue LED 26 on.

In addition, the controller 37 may generate a connection-state indicating sound, and output this sound through the speaker 30. In this case, the user can be allowed to intuitively notice through the user's auditory sense that the synchronization for the wireless connection has been established according to the connection-state indicating sound emitted from the speaker 30.

The controller 37 starts wireless communication with the cellular phone 3 while maintaining wireless connection thereto. When the answer switch 16 of the operating unit 19 is depressed, the controller 37 causes the cellular phone 3 to execute a calling process or an incoming call receiving process to establish a call between the cellular phone 3 and a base station, thus ensuring voice talking.

In practice, when having received voice data of a talking party sent from the Bluetooth module 10 of the cellular phone 3 through the antenna 13 at the time of wireless communication, the Bluetooth communication processor 41 generates a voice signal by executing predetermined signal processing on the voice data, and sends processes data to the car audio 40 through the wired interface 35 and the control unit 4. This makes it possible for the user to hear the voice of the talking party sent from the cellular phone 3, through the in-vehicle front speaker (on, for example, a navigator's seat side in this case).

The controller 37 sends the voice signal of the user collected through the microphone 7 to the Bluetooth communication processor 41, executes predetermined signal processing on that voice signal, and sends the processed signal as the radio wave of wireless communication in compliance with the Bluetooth defined as the short-range (or near field) wireless communication standard, to the cellular phone 3 through the antenna 13.

Thus, the in-vehicle hand-free apparatus 2 receives a signal transmitted from the hand-free remote controller 6 through the Bluetooth module 10 of the cellular phone 3, and transmits that signal to a base station through the antenna of the cellular phone 3, thereby transmitting the voice of the user input through the microphone 7 of the hand-free remote controller 6 to the other cellular phone.

At this time, the controller 37 can notify various operation statuses using the light emitting unit 11 and the speaker 30.

(Light Emitting Operation of Light Emitting Unit and Sounding Operation of Speaker)

Next, the light emitting operation of the light emitting unit 11 and the sounding operation of the speaker 30 in accordance with various operation statuses of the in-vehicle hand-free apparatus 2 after synchronization for wireless connection to the cellular phone 3 are established will be explained with reference to time charts in FIGS. 5 to 11.

(Timing For Calling Instruction Operation)

The in-vehicle hand-free apparatus 2 sends the name or phone number of the other party, which is input through the microphone 7 by the user in voice, as voice data to the cellular phone 3 through the antenna 13. When having received the voice data through the Bluetooth module 10, the cellular phone 3 recognizes the name of the other party or the like by voice recognition means (not illustrated), and automatically executes a calling process, thus establishing a call between the cellular phone 3 and the base station.

In practice, as illustrated in FIG. 5(a), when the answer switch 16 of the operating unit 19 is pressed, the speaker 30, as illustrated in FIG. 5(b), generates a short sound (of 0.3 sec. in this case) as a switch confirmation sound and in response to the depression. As illustrated in FIG. 5(c), the Bluetooth communication processor 41 starts wireless communication, and sends a calling instruction signal to the cellular phone 3 through the antenna 13. When having received the calling instruction signal through the Bluetooth module 10, the cellular phone 3 executes the calling process based on the calling instruction signal, establishes a call between the cellular phone 3 and the base station, then starts voice talking to the other cellular phone. In this manner, the user can control the calling process through the in-vehicle hand-free apparatus 2 without directly operating the cellular phone 3.

Upon recognition of the start of the wireless communication between the cellular phone 3 and the hand-free remote controller 6, as illustrated in FIG. 5(e), the controller 37 makes the lighting blue LED 26 flicker in, for example, a slow period having a long interval between the individual flickers (hereinafter, "first period"). Therefore, the user can perceive the wireless communication in which the voice data transmission and reception are carried out between the cellular phone 3 and the hand-free remote controller 6 based on a change in the emission state of the blue LED 26 (in this case, flickering at the first period).

As illustrated in FIGS. 5(d) and 5(b), when having received a predetermined signal sent from the Bluetooth module 10 at the time of the start or end of a recognition time at which the cellular phone 3 recognizes the name of the third party or the like by the voice recognition means, through the antenna 13, the controller 37 makes the speaker 30 generate a confirmation sound.

A predetermined time T1 in the figure is defined by the communication state with the Bluetooth module 10 of the cellular phone 3 and the Bluetooth communication processor 41, and a predetermined time T2 is defined by the cellular phone 3.

(Timings For Reception of Incoming Call and Talking)

As illustrated in FIGS. 6(a) and 6(d), when there is an incoming call to the cellular phone 3, the in-vehicle hand-free apparatus 2 starts wireless communication between the cellular phone 3 and the hand-free remote controller 6 which are wirelessly connected, and receives an incoming call notification signal transmitted from the Bluetooth module 10 of the cellular phone 3 through the antenna 13. Accordingly, the controller 37 outputs an incoming call notifying sound from the in-vehicle front speaker (not illustrated) through the car audio 40 according to the incoming call notification signal.

As illustrated in FIG. 6(c), when the cellular phone 3 and the hand-free remote controller 6 start the wireless communication, the controller 37 generates a short sound as a wireless communication confirmation sound from the speaker 30. Accordingly, the user can perceive through the user's auditory sense that the wireless communication with the cellular phone 3 has started and the incoming call is currently received.

In addition, when the wireless communication is started, the controller 37 starts making the blue LED 26 flicker in, for example, a fast period having a short interval between the individual flickers (hereinafter, "second period"), as illustrated in FIG. 6(f), based on the incoming-call notification signal. This makes it possible for the user to perceive that the wireless communication with the cellular phone 3 has started and the incoming call is currently received, based on the light emitting state (in this case, flickering in the second period) of the blue LED 26.

After that, in the incoming call reception state, as illustrated in FIG. 6(b), when the answer switch 16 is pressed, the controller 37 makes the speaker 30 generate a short sound as a switch confirmation sound in response to that depression, generates an incoming-call instruction signal, and sends this signal through the Bluetooth communication processor 41 and the antenna 13. When having received the incoming call instruction signal through the Bluetooth module 10, the cellular phone 3 starts talking with the other cellular phone through the in-vehicle hand-free apparatus 2 as illustrated in FIG. 6(e).

At that time, the controller 37 recognizes the start of the voice talking based on the voice data from the cellular phone 3, and as illustrated in FIG. 6(f), shifts the flickering state of the blue LED 26 in the second period to the flickering state thereof in the first period. This allows the user to perceive the start of the talking to the other cellular phone based on a change in the emission state (in this case, flickering in the first period) of the blue LED 26.

(Timing For Rejecting Reception of Incoming Call)

As illustrated in FIGS. 7(b) and 7(d), with the cellular phone 3 being in the incoming call reception state, when the answer switch 16 is pressed twice in, for example, approximately one second, the controller 37 generates an incoming call instruction signal and a talk termination signal in response to that presses, and sends those signals through the Bluetooth communication processor 41 and the antenna 13. The cellular phone 3 receives the incoming call instruction signal and the talk termination signal through the Bluetooth module 10, thus compulsively terminating the incoming call reception state. As illustrated in FIG. 7(b), the controller 37 makes the speaker 30 generate a switch confirmation signal in accordance with the depression of the answer switch 16. The controller 37 shifts the flicker of the blue LED 26 in the second period to a light-up state after the incoming call reception state is compulsively ended. Accordingly, the user can perceive the end of the incoming call reception state of the cellular phone 3 based on a change in the emission state of the blue LED 26 (in this case, light-up state).

(Timing For Transition Between Manual and Auto Modes)

Next, according to the in-vehicle hand-free apparatus 2, when the cellular phone 3 receives an incoming call, pressing the answer switch 16 permits selection of a manual mode for starting talking on the cellular phone 3 or an auto mode for automatically staring ting after approximately 10 second from the reception of the incoming call.

In practice, as illustrated in FIG. 8(a), when the volume-down switch 18 of the operating unit 19 is pressed for approximately five seconds or longer, the controller 37 shifts from the manual mode to the auto mode, or vice versa.

As the volume-down switch 18 is continuously pressed in the manual mode, as illustrated in FIG. 8(b), the controller 37 makes the speaker 30 generate a switch confirmation sound when the depression of the volume-down switch 18 is started, and a long sound as an auto mode shift confirmation sound when the manual mode is sifted to the auto mode. This allows the user to intuitively perceive the shift from the manual mode to the auto mode based on the long sound from the speaker 30 through the user's auditory sense.

In contrast, as the volume-down switch 18 is kept pressed in the auto mode, as illustrated in FIG. 8(c), the controller 37 makes the speaker 30 generate a switch confirmation sound when the depression of the volume-down switch 18 starts, and a short sound twice as a manual mode shift confirmation sound when the auto mode is sifted to the manual mode. This allows the user to intuitively perceive the shift from the auto mode to the manual mode based on the two short sounds from the speaker 30 through the user's auditory sense.

(Timing For Redial Operation)

When the synchronization for the wireless connection to the cellular phone 3 have been established, but no wireless communication with a voice talking has been carried out, pressing the volume-down switch 18 and the answer switch 16 causes the controller 37 to generate a redial instruction signal, and send this signal to the cellular phone 3 through the Bluetooth communication processor 41 and the antenna 13. This allows the cellular phone 3 to execute a calling process with respect to the most latest talking party in the talking log by receiving the redial instruction signal through the Bluetooth module 10.

In practice, as illustrated in FIGS. 9(a) to 9(c), when the volume-down switch 18 and the answer switch 16 are pressed, the controller 37 makes the speaker 30 generate the respective switch confirmation sounds. The controller 37 then starts wireless communication with the cellular phone 3 as illustrated in FIG. 9(d). At this time, as illustrated in FIG. 9(f), the controller 37 generates a first flicker signal, and sends this signal to the blue LED 26, so that the lighting blue LED 26 flickers in the first period. Accordingly, the user can perceive the start of the wireless communication with the cellular phone 3 and the provision of the redial operation instruction to the cellular phone 3 based on a change in the emission state of the blue LED 26 (in this case, flickering in the first period).

Therefore, as illustrated in FIG. 9(e), by carrying out the wireless communication with the hand-free remote controller 6, the cellular phone 3 can execute the calling process to the most latest talking party in the talking log based on the redial instruction signal from the hand-free remote controller 6.

(Timing For Microphone-Mute Operation)

The in-vehicle hand-free apparatus 2 can forcibly terminate the collection of a voice during the talking by the microphone 7 of the hand-free remote controller 6.

In practice, during the talking, as illustrated in FIGS. 10(a), 10(c), and 10(e), when the volume-down switch 18 is pressed for approximately two seconds, the controller 37 generates a voice-collection termination signal, and the voice collection by the microphone 7 is terminated in accordance with the voice-collection termination signal. At this time, as illustrated in FIG. 10(d), the controller 37 generates a voice-collection termination indicating emission signal, and sends this signal to the light emitting unit 11, so that the OFF-state red LED 27 lights up. This makes it possible for the user to perceive that the voice collection by the microphone 7 is currently terminated based on the emission state of the red LED 27.

In this condition, when the volume-down switch 18 is further pressed for approximately two seconds as illustrated in FIGS. 10(a), 10(c), and 10(e), the controller 37 generates a voice-collection restart indicating emission signal, and the voice collection by the microphone 7 is restarted in accordance with this signal. At this time, as illustrated in FIG. 10(d), the controller 37 generates a voice-collection restart indicating emission signal, and sends this signal to the light emitting unit 11, so that the lighting red LED 27 is turned out. This makes it possible for the user to perceive the restart of the voice collection by the microphone 7 based on the turning off of the red LED 27.

As illustrated in FIG. 10(b), when the volume-down switch 18 is pressed, the controller 37 makes the speaker 30 generate a switch confirmation sound, and when the volume-down switch 18 is pressed for approximately two seconds, the controller 30 makes the speaker 30 generate a change-over notifying sound. The user can perceive that whether or not the voice collection by the microphone 7 is terminated or restarted through the user's auditory sense base on the change-over notifying sound.

(Timing For ON/OFF Operation)

When the in-vehicle hand-free apparatus 2 is powered on and in the on state, pressing the answer switch 16 for more than or equal to approximately five seconds causes the termination of the power supply to the individual circuits, and the turning off of the power. When the in-vehicle hand-free apparatus 2 is powered off, pressing any one of the answer switch 16, the volume-up switch 17 and the volume-down switch 18 causes turning on of the power (that is, power-on) and the power is supplied to the individual circuits.

In practice, as illustrated in FIGS. 11(d), 11(e), and 11(f), when the power is on, the controller 37 supplies the power to the Bluetooth communication processor 41 and the backlight LED 24, and when the wireless communication with the cellular phone 3 is carried out, the controller 37 lights up the blue LED 26.

At this time, as illustrated in FIG. 11(a), when the answer switch 16 is pressed for more than or equal to approximately five seconds, the controller 37 makes the speaker 30 generate an off-confirmation sound as illustrated in FIG. 11(c), and as illustrated in FIGS. 11(d) to 11(f), terminates the supply of the power to the Bluetooth communication processor 41 and the backlight LED 24, thus turning off the blue LED 26.

Subsequently, as illustrated in FIG. 11(b), in a case where either one of the volume-up switch 17 and the volume-down switch 18 (that is, operating unit 19) is pressed, the controller 37 makes the speaker 30 generate an on-confirmation sound as illustrated in FIG. 11(c), and as illustrated in FIGS. 11(d) to 11(f), supplies the power to the Bluetooth communication processor 41 and the backlight LED 24, and when wireless communication with the cellular phone 3 is carried out, the controller 37 lights up the blue LED 26.

(Connection-State Indicating Emission and Notification Process and Status Notification Process)

Figure 12:
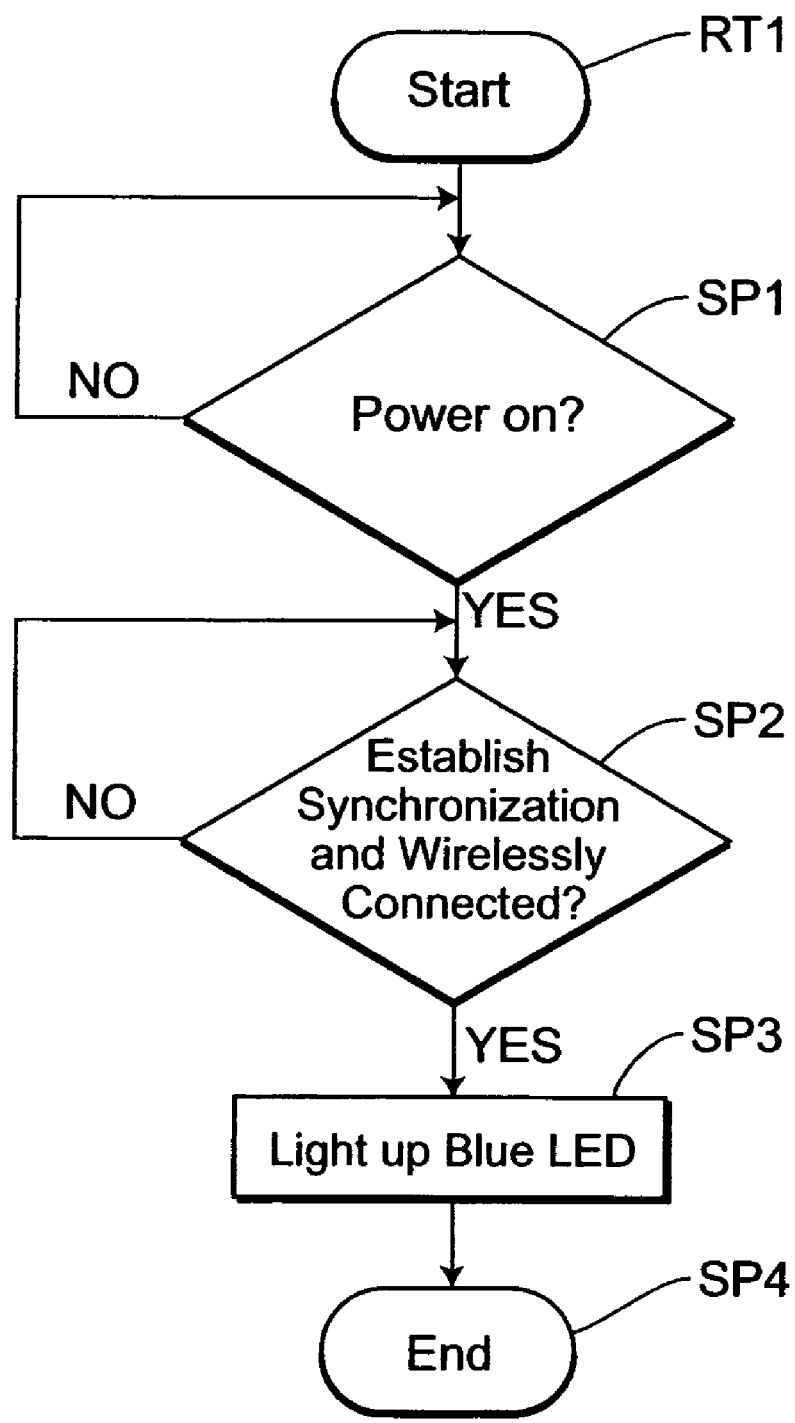
FIG. 12 is a flowchart illustrating the procedures of a process of notifying connection-state by light emission.

Next, a process of notifying a connection state by light emission when the in-vehicle hand-free apparatus 2 is powered on will be summarized in a flowchart as FIG. 12.

The controller 37 starts the process from start step of routine RT1, and the flow proceeds to step SP1. In the step SP1, the controller 37 determines whether or not the in-vehicle hand-free apparatus 2 is powered on.

Obtaining a negative result in this step means that an ignition key is not in a position of ACC so that no power is supplied to the in-vehicle hand-free apparatus 2, or the answer switch 16 is pressed for more than or equal to approximately five seconds so that the power is off. In this case, the controller 37 waits until the power is on.

In contrast, when a positive result is obtained at the step SP1, this means that the ignition key is at the position of ACC so that the power is supplied to the in-vehicle hand-free apparatus 2, or any one of the answer switch 16, the volume-up switch 17 and the volume-down switch 18 is pressed so that the power is on. The process of the controller 37 proceeds to next step SP2.

In the step SP2, the controller 37 receives a signal, as a radio wave of wireless communication in compliance with the Bluetooth defined as the short-range wireless communication standard, transmitted from the Bluetooth module 10 of the cellular phone 3 at individual predetermined intervals, and determines whether or not synchronization between the hand-free remote controller 6 and the cellular phone 3 is established and they are wirelessly connected.

Obtaining a negative result at this step means that synchronization between the hand-free remote controller 6 and the cellular phone 3 is not established and they are not wirelessly connected. In this case, the controller 37 waits until synchronization between the hand-free remote controller 6 and the cellular phone 3 is established and they are wirelessly connected.

At this time, because the controller 37 is not wirelessly connected to the cellular phone 3, the controller 37 keeps the blue LED 26 of the light emitting unit 11 turning off, thus making the user perceive that the hand-free remote controller 6 and the cellular phone 3 is not wirelessly connected.

In contrast, when a positive result is obtained at the step SP2, this means that the hand-free remote controller 6 and the cellular phone 3 establish synchronization with each other and are wirelessly connected together, and further, a state where the cellular phone 3 directly and Tirelessly connected to the hand-free remote controller 6 does not establish a call with a base station (not illustrated), that is, a stand-by status. In this case, the process of the controller 37 proceeds to next step SP3.

In the step SP3, the controller 37 generates a connection state indicating emission signal indicating that wireless connection state, and the blue LED 26 is lighted up in accordance with that signal, thus making the user perceive the wireless connection of the hand-free remote controller 6 with the cellular phone 3. The flow goes to next step SP4, and the connection state indicating emission and notification process is finished.

Figure 13:
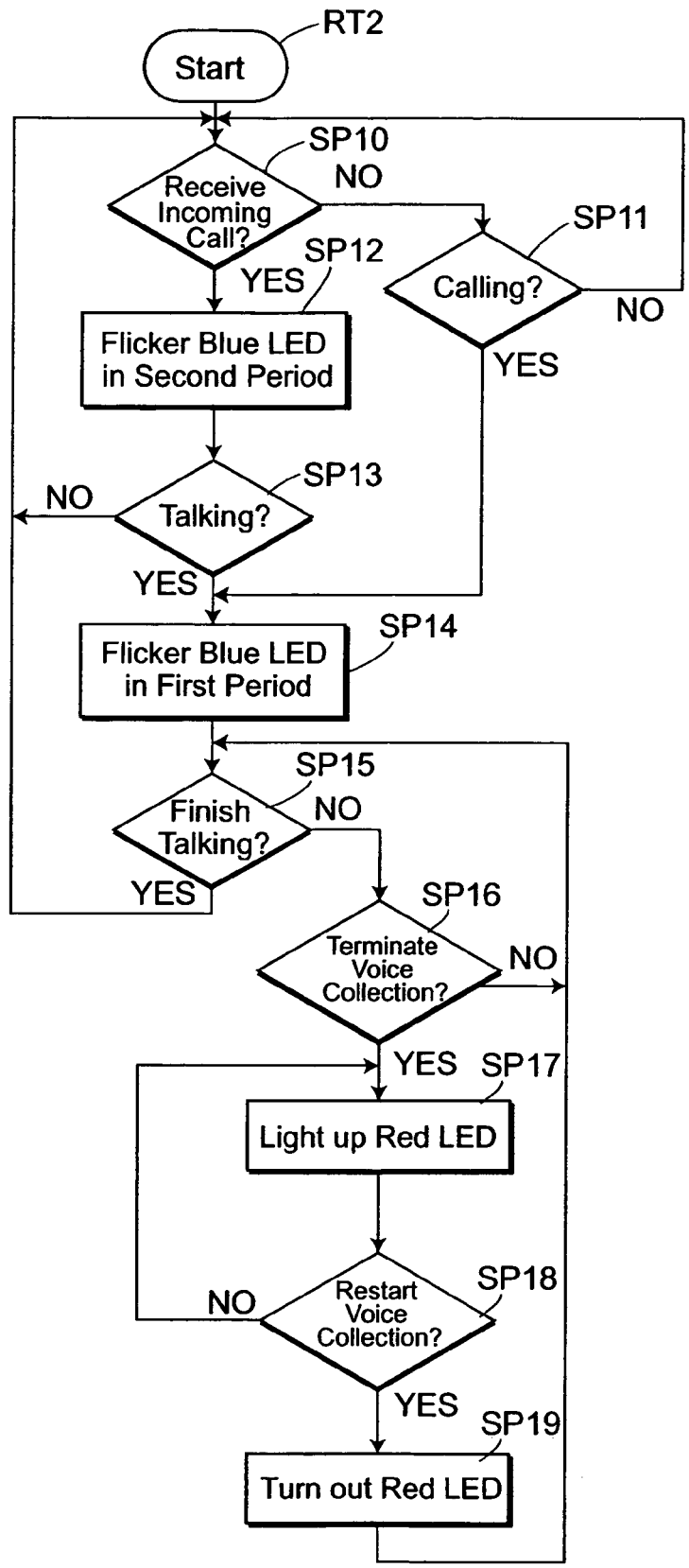
FIG. 13 is a flowchart illustrating the procedures of a status-notification process.

Next, a status notification process of the in-vehicle hand-free apparatus 2 will be summarized in a flowchart as FIG. 13.

The controller 37 starts the process from start step of routine RT 2, and the flow proceeds to step SP10. In the step SP10, the controller 37 determines whether or not the cellular phone 3 receives an incoming call.

Obtaining a negative result at this step means that there is no incoming call to the cellular phone 3, and in this case, the process of the controller 37 proceeds to next step SP 11. In the step SP11, the controller 37 determines whether or not calling through the answer switch 16 is carried out.

Obtaining a negative result at this step means that neither incoming call operation nor calling operation is carried out, and in this case, the process of the controller 37 goes back to the step SP10, and the processes as described above are repeated.

In contrast, when a positive result is obtained at the step SP10, this means that there is an incoming call to the cellular phone 3, and the process of the controller 37 proceeds to next step SP12.

In the step SP12, the controller 37 generates an incoming-call notification signal which indicates the start of wireless connection, and an incoming-call status, and the blue LED 26 flickers in the second period in accordance with that signal, and the flow goes to next step SP13.

In the step SP13, the controller 37 determines whether or not the cellular phone 3 is in talk to the other cellular phone and a wired telephone Obtaining a negative result at this step means that the cellular phone 3 is not in talk, that is, the answer switch 16 is not yet pressed in the incoming call status at the time of the manual mode, or approximately 10 seconds are not yet passed from the start of the reception of the incoming call at the time of the auto mode so that a talking is not automatically started at the time of the auto mode. In this case, the process of the controller 37 goes back to the step SP10, and the blue LED 26 keep flickering in the second period as long as the incoming-call status continues.

In contrast, when a positive result is obtained at the step SP13, this means that the cellular phone 3 is in talk, that is, the answer switch 16 is pressed at the time of the manual mode, or approximately 10 seconds are passed from the start of the reception of the incoming call so that a talking is automatically started at the time of the auto mode. In this case, the process of the controller 37 proceeds to next step SP14.

In the step SP14, the controller 37 generates the first flicker signal which indicates the start of the wireless communication between the cellular phone 3 and the cellular phone 3 is in talk, and the blue LED 26 flickers in the first period in accordance with the first flicker signal. The flow goes to next step SP15.

Meanwhile, in the step SP11, obtaining a positive result means that the answer switch 16 is pressed and calling is carried out, and in this case, the process of the controller 37 proceeds to the next step SP14.

In the step SP15, the controller 37 determines whether or not the talk is finished by the press of the answer switch 16. Obtaining a positive result at this step means that the user has pressed the answer switch 16 to finish the talking, and in this case, the flow goes back to the step SP10, and the controller 37 repeats the above-described processes. In contrast, obtaining a negative result at the step SP15 means that the cellular phone 3 is yet in talk, and the process of the controller 37 proceeds to next step SP16.

In the step SP16, the controller 37 determines whether or not voice collection by the microphone 7 is terminated by the press of the volume-down switch 18 for approximately two seconds.

Obtaining a negative result at this step means that the volume-down switch 18 has not been pressed for approximately two seconds and the voice collection by the microphone 7 is carried out, and in this case, the flow goes back to the step SP15, and the controller 37 repeats the above-described processes.

In contrast, obtaining a positive result at the step SP16 means that the volume-down switch 18 has been pressed for approximately two seconds and the voice collection by the microphone 3 is terminated, and in this case, the process of the controller 37 proceeds to next step SP17.

In the step SP17, the controller 37 generates the voice-collection termination indicating emission signal, and sends this signal to the red LED 27, so that the OFF-state red LED 27 lights up, and the flow proceeds to next step SP18.

In the step SP18, the controller 37 determines whether or not the volume-down switch 18 has been pressed for approximately two seconds and the voice collection by the microphone 7 is restarted.

Obtaining a negative result at this step means that the volume-down switch 18 has not been pressed for approximately two seconds, and the voice collection by the microphone 7 is yet terminated, and in this case, the process of the controller 37 returns to the step SP17, and the controller 37 keeps the red LED 27 lighting.

In contrast, obtaining a positive result at the step SP18 means that the volume-down switch 18 has been further pressed for approximately two seconds, and the voice collection by the microphone 7 is restarted, and in this case, the process of the controller 37 proceeds to next step SP19.

In the step SP19, the controller 37 generates the voice-collection restart indicating emission signal, and sends this signal to the red LED 27, and, the lighting red LED 27 is turned out. The flow goes back to the step SP15, and the above-described processes are repeated.

(Operation and Effect)

According to the above-described structure, the in-vehicle hand-free apparatus 2 can recognize wireless connection to the cellular phone 3 by a radio wave of a short-range wireless communication system in compliance with the Bluetooth, and notify the recognition results to the user in the predetermined ways.

Accordingly, when the in-vehicle hand-free apparatus 2 is unable to establish synchronization with the cellular phone 3 and is not wirelessly connected thereto, the speaker 30 generates the predetermined non-connection state indicating sound, and the blue LED 26 is turned out, thereby making a user easily perceive a case where the in-vehicle hand-free apparatus 2 is away from the cellular phone 3 at such a distant that reception of a radio wave of a short-range wireless communication system in compliance with the Bluetooth, or a case where the cellular phone 3 is not powered on.

In a case where the in-vehicle hand-free apparatus 2 establishes synchronization with the cellular phone 3 and is wirelessly connected thereto, the blue LED 26 is lighted up, thereby making the user easily perceive a case where a distant between the in-vehicle hand-free apparatus 2 and the cellular phone 3 is so maintained as to allow the reception of a radio wave of a short-range wireless communication system in compliance with the Bluetooth, or a case where the cellular phone 3 is powered on.

With the in-vehicle hand-free apparatus 2 establishing synchronization with the cellular phone 3 and being wirelessly connected thereto, when the cellular phone 3 starts communication through the hand-free remote controller 6, the blue LED 26 flickers in the first period, thus allowing the user to easily perceive that the communication is currently carried out through the cellular phone 3.

With the in-vehicle hand-free apparatus 2 establishing the synchronization with the cellular phone 3 and being wirelessly connected thereto, when the cellular phone 3 receives an incoming call, the speaker 30 generates the predetermined wireless-connection confirmation sound and the blue LED 26 flickers in the second period, thus allowing the user to easily perceive that there is the incoming call to the cellular phone 3.

According to the in-vehicle hand-free apparatus 2, when voice collection by the microphone 7 of the hand-free remote controller 6 is terminated during the talking of the cellular phone 3, the speaker 30 generates the predetermined change-over notifying sound and the red LED 27 is lighted up. This makes it possible for the user to easily perceive that the voice collection by the microphone 7 of the hand-free remote controller 6 is being terminated.

According to the in-vehicle hand-free remote controller 2, the hand-free remote controller 6 is so structured as to be a separate body from the control unit 4. The hand-free remote controller 6 is located on the pillar 8 positioned near the front of the head of the user sitting at the driver's seat, and is provided with the light emitting unit 11. Therefore, the in-vehicle hand-free apparatus 2 permits the user to easily perceive the emission state with the user sitting at the driver's seat and viewing the front. This results in assured confirmation of the operation status of the in-vehicle hand-free apparatus 2.

As explained above, according to the embodiment, the in-vehicle hand-free apparatus 2 for carrying out hand-free talk on the cellular phone 3 used in the vehicle is provide with the notification unit 42, and this notification unit 42 notifies the user of the status of the in-vehicle hand-free apparatus 2. This enables the user to easily confirm the operation status of the in-vehicle hand-free apparatus 2.

According to the embodiment, the operating unit 19 is provided in the case body 12, and the light emitting unit 11 and the speaker 30, which operate in accordance with the operation of the operating unit 19 by the user, are provided. The light emitting unit 11 and the speaker 30 notifies the user of the status of the in-vehicle hand-free apparatus 2, and this allows the user to easily confirm the status of the in-vehicle hand-free apparatus 2 through the user's visual sense and the auditory sense.

Further, according to the embodiment, the light emitting unit 11 is provided at the back of the operating unit 19. Thus, the light emitting unit 11 can be generally positioned at the operating unit 19 which is visible to the user, and this facilitates confirmation of the status of the in-vehicle hand-free apparatus 2 through the user's visibility, further.

Still further, according to the embodiment, the change in the emission state of the light emitting unit 11 notifies the user of the status of the in-vehicle hand-free apparatus 2, and the change in the sound state of the speaker 30 notifies the user of the state of the in-vehicle hand-free apparatus 2. This ensures the user to intuitively confirm the plural states of the in-vehicle hand-free apparatus 2.

Other Embodiments

In the above embodiment, whilst the explanation has been given of the case where the cellular phone 3 and the hand-free remote controller 6 are wirelessly connected by a short-range wireless communication system radio wave in compliance with the Bluetooth, the invention is not limited to this case, and the cellular phone 3 and the hand-free remote controller 6 may be wirelessly connected by various short-range wireless communication system such as the infrared communication system and the like.

In the above-described embodiment, although the explanation has been given of the case where the blue LED 26 and the red LED 27 which constitute the light emitting unit at the back of the operating unit are provided at the one end-side back of the operating unit 19 at the front face 15 of the case body 12, the invention is not limited to this case, and the blue LED 26 and the red LED 27 may be provided at the backs of the semi-transparent covers, which are respectively disposed over the answer switch 16, the volume-up switch 17, and the volume-down switch 18, together with the backlight LED 24.

In this case, the semi-transparent covers 21, 22, and 23 can be entirely illuminated in blue or red from the insides thereof in accordance with the operation status of the in-vehicle hand-free apparatus 2. This facilitates the user to confirm the status of the in-vehicle hand-free apparatus 2, further.

In the above-described embodiment, although the explanation has been given of the case where the controller 37 which controls the various operations of the hand-free remote controller 6 overall is provided in the control unit 4, the invention is not limited to this case. A controller which controls the various operations of the hand-free remote controller 6 overall, or a controller which controls only the light emitting operation of the light emitting unit 11 and the sound generation operation of the speaker 30 may be provided in the hand-free remote controller 6.

Further, in the above-described embodiment, whilst the explanation has been given of the case where the notification unit 42 as notification means comprises the light emitting unit 11 and the speaker 30, the invention is not limited to this case. The notification unit may comprise either one of the light emitting unit 11 and the speaker 30.

The invention is not limited to those embodiments, various changes are possible within the scope of the invention. For example, LEDs of various colors may be used instead of the blue LED 26 and the red LED 27, the first and second periods may be set as various intervals, and the Bluetooth communication processor 41 may be provided in the control unit 4.

What is claimed is:

1. An in-vehicle hand-free apparatus for ensuring hand-free talking in a vehicle using a phone, comprising:
    a case body located on a pillar positioned near a front of a head of a user sitting at a driver's seat;
    a communication processor wirelessly connected to said phone by a radio wave of a short-range wireless communication system, said communication processor being disposed on one end side in said case body;
    a microphone for collecting the voice of a user, said microphone being disposed in front of another end side in said case body;
    a sound generating device for generating a predetermined notifying sound, said sound generating device being provided near an approximate center of a rear face of said case body containing the pillar;
    an operating unit provided on a top face of said case body along a lengthwise direction, said operating unit including an answer switch for talking, talking in response to an incoming call, terminating talk, and turning off power, a volume-up switch for turning up the volume of the voice of a talking party, and a volume-down switch for turning down the volume of the voice of the talking party and shifting said in-vehicle hand-free apparatus from a manual mode to an auto mode or vice versa by pressing said volume-down switch for a predetermined period of time wherein, in the auto mode, said in-vehicle hand-free apparatus automatically answers the incoming calls on the phone and in the manual mode said in-vehicle hand-free apparatus requires pressing said answer switch to answer the incoming calls on the phone; and
    a light emitting unit which is disposed on a front of said case body and between said microphone and said answer switch,
    wherein said light emitting unit comprises two LEDs each emitting a different color arranged in a widthwise direction of said case body, and said light emitting unit emits light in a predetermined first emission color when said in-vehicle hand-free apparatus is in a status of wireless-connection where synchronization of said communication processor with said phone is established, or in a status capable of voice-talking where a call between said phone and a base station is established, and
    wherein said light emitting unit emits light in a second emission color different from said first emission color when the voice-collection by said microphone is terminated in accordance with the operation of said operating unit.

2. The in-vehicle hand-free apparatus according to claim 1, wherein said light emitting unit and said sound generating device operate in accordance with an operation of said operating unit performed by a user.

3. The in-vehicle hand-free apparatus according to claim 1, wherein said light emitting unit is provided at a back of said operating unit.

4. The in-vehicle hand-free apparatus according to claim 2, wherein said light emitting unit is provided at a back of said operating unit.

5. The in-vehicle hand-free apparatus according to claim 1, wherein said light emitting unit changes an emission state to notify the status of said in-vehicle hand-free apparatus.

6. The in-vehicle hand-free apparatus according to claim 1, wherein said sound generating device changes a sound state to notify the status of said in-vehicle hand-free apparatus.

7. The in-vehicle hand-free apparatus according to claim 6, wherein said light emitting unit changes an emission state to notify the status of said in-vehicle hand-free apparatus.

8. The in-vehicle hand-free apparatus according to claim 1, wherein when said in-vehicle hand-free apparatus is unable to establish synchronization with said phone and is not wirelessly connected thereto, said sound generating device generates a predetermined disconnection-state indicating sound, and said light emitting unit turns out light.

9. The in-vehicle hand-free apparatus according to claim 1, wherein said light emitting unit flickers in said first emission color in a first period to notify said user of talking over said phone being in progress when talking over said phone starts, and flickers in said first emission color in a second period to notify said user of an incoming call to said phone when said phone has received that call.

10. The in-vehicle hand-free apparatus according to claim 1, said light emitting unit is provided in a transparent cover in front of said case body, wherein said user sees an emission state of said light emitting unit through said transparent cover.

* * * * *